United States Patent
He et al.

(10) Patent No.: US 12,363,651 B2
(45) Date of Patent: Jul. 15, 2025

(54) TECHNIQUES FOR SIGNALING MAXIMUM PERMISSIBLE EXPOSURE BACKOFF INDICATION

(71) Applicant: QUALCOMM Incorporated, San Diego, CA (US)

(72) Inventors: Linhai He, San Diego, CA (US); Ruiming Zheng, Beijing (CN); Timo Ville Vintola, San Diego, CA (US); Masato Kitazoe, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 351 days.

(21) Appl. No.: 17/759,946

(22) PCT Filed: Apr. 9, 2020

(86) PCT No.: PCT/CN2020/083908
§ 371 (c)(1),
(2) Date: Aug. 2, 2022

(87) PCT Pub. No.: WO2021/203348
PCT Pub. Date: Oct. 14, 2021

(65) Prior Publication Data
US 2023/0065305 A1 Mar. 2, 2023

(51) Int. Cl.
*H04W 52/36* (2009.01)
*H04W 52/14* (2009.01)
(Continued)

(52) U.S. Cl.
CPC ....... *H04W 52/367* (2013.01); *H04W 52/146* (2013.01); *H04W 52/365* (2013.01); *H04W 72/23* (2023.01); *H04W 80/02* (2013.01)

(58) Field of Classification Search
CPC .................................................. H04W 52/367
See application file for complete search history.

(56) References Cited

U.S. PATENT DOCUMENTS

2012/0207112 A1* 8/2012 Kim ..................... H04W 52/545
370/328
2013/0100916 A1* 4/2013 Park ..................... H04W 52/365
370/329
(Continued)

FOREIGN PATENT DOCUMENTS

WO 2018111844 A1 6/2018

OTHER PUBLICATIONS

Intel Corporation, "Indication and reporting enhancements to mitigate RLF", Nov. 2019, 3GPP RAN4 WG Meeting #92Bis, R4-1913576 (Year: 2019).*
(Continued)

*Primary Examiner* — Jason E Mattis
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may determine an average energy level radiated by the UE over a time period. The UE may determine whether the average energy level radiated by the UE over the time period exceeds a maximum permissible exposure (MPE) limit. The UE may transmit, to base station, a medium access control (MAC) control element (MAC-CE) that includes information related to a power management maximum power reduction (P-MPR) applied at the UE and/or an uplink duty cycle in effect at the UE based at least in part on the average energy level radiated by the UE over the time period exceeding the MPE limit. Numerous other aspects are provided.

35 Claims, 13 Drawing Sheets

424
PHR MAC-CE including separate fields to indicate P-MPR and uplink duty cycle per cell

(51) Int. Cl.
*H04W 72/23* (2023.01)
*H04W 80/02* (2009.01)

(56) References Cited

U.S. PATENT DOCUMENTS

| | | | |
|---|---|---|---|
| 2017/0289928 A1* | 10/2017 | Wang | H04W 52/146 |
| 2018/0167897 A1 | 6/2018 | Sampath et al. | |
| 2019/0200365 A1 | 6/2019 | Sampath et al. | |
| 2019/0222326 A1 | 7/2019 | Dunworth et al. | |
| 2019/0306850 A1* | 10/2019 | Zhang | H04B 7/0465 |
| 2020/0021421 A1 | 1/2020 | Han et al. | |
| 2020/0145927 A1* | 5/2020 | Sun | H04W 52/146 |
| 2021/0045070 A1* | 2/2021 | Yi | H04W 76/27 |
| 2021/0144652 A1* | 5/2021 | Gheorghiu | H04W 52/365 |
| 2021/0297959 A1* | 9/2021 | Zhou | H04B 1/3838 |

OTHER PUBLICATIONS

Ericsson: et al., "P-MPR Reporting fm MPE Enhancement", 3GPP TSG-RAN WG4 Meeting #94-e, R4-2001324, Mar. 6, 2020 (Jun. 3, 2020), 4 Pages, sections 1 and 2.

International Search Report and Written Opinion—PCT/CN2020/083908—ISA/EPO—Dec. 31, 2020.

Nokia, et al., "UE FR2 MPE Enhancements and Solutions", 3GPP Draft, R4-2001382, 3GPP RAN WG4 Meeting #94-e, 3rd Generation Partnership Project (3GPP), Mobile Competence Centre, 650, Route Des Lucioles, F-06921 Sophia-Antipolis Cedex, France, vol. RAN WG4, No. Online, Feb. 24, 2020-Mar. 6, 2020, Feb. 14, 2020 (Feb. 14, 2020), XP051851300, 5 Pages, Retrieved from the Internet: URL:https://ftp.3gpp.org/tsg_ran/WG4_Radio/TSGR4_94_e/Docs/R4-2081382.zip R4-2001382 FR2 UE PE Enhancements.doc [retrieved on Feb. 14, 2020] the Whole Document.

Interdigital Inc: "Pre-Emptive Approach for MPE and SAR Issues Mitigation", 3GPP TSG-RAN Working Group 4 (Radio) #92bis, R4-1911208, 3rd Generation Partnership Project, Mobile Competence Centre, 650, Route Des Lucioles, F-06921 Sophia-Antipolis Cedex, France, vol. TSG RAN, No. Chongqing, CN, Oct. 14, 2019-Oct. 18, 2019, Oct. 4, 2019, 4 Pages, XP051806025, Section 2.1.

Interdigital Inc: "Pre-Emptive Solution for MPE Issues Mitigation", 3GPP TSG-RAN Working Group 4 (Radio) #93, R4-1913690, 3rd Generation Partnership Project, Mobile Competence Centre, 650, Route Des Lucioles, F-06921 Sophia-Antipolis Cedex, France, vol. RAN WG4, No. Reno, NV, USA, Nov. 18, 2019-Nov. 22, 2019, Nov. 8, 2019, 8 Pages, XP051818229, Sections 2.1, 2.2, 3, Appendix C.

Interdigital: "L2/3 Aspects of MPE Mitigation", 3GPP RAN WG2 Meeting #109-e, R2-2000178, 3rd Generation Partnership Project, Mobile Competence Centre, 650, Route Des Lucioles, F-06921 Sophia-Antipolis Cedex, France, vol. RAN WG2, No. e-meeting, Feb. 24, 2020-Mar. 6, 2020, Feb. 13, 2020, 5 Pages, XP052355370, Sections 1 and 2, Appendix B,.

Supplementary European Search Report—EP20929723—Search Authority—The Hague—Nov. 27, 2023.

Apple Inc: "Further Considerations on the Uplink Duty Cycle Enhancements for the MPE Scenario", R4-2000006, 3GPP RAN WG4 Meeting #94-e Electronic meeting, Feb. 24-Mar. 6, 2020, 9 Pages.

Ericsson, et al., "P-MPR Reporting for MPE Enhancement", R4-2001324, 3GPP TSG-RAN WG4 Meeting #94-e Electronic meeting, Feb. 24-Mar. 6, 2020, 4 Pages.

Interdigital Inc: "Pre-Emptive Solution for MPE Issues Mitigation", 3GPP TSG-RAN Working Group 4 (Radio) #93, R4-1913690, 3rd Generation Partnership Project, Mobile Competence Centre, 650, Route Des Lucioles, F-06921 Sophia-Antipolis Cedex, France, vol. RAN WG4, No. Reno, NV, USA, Nov. 18, 2019-Nov. 22, 2019, Nov. 8, 2019, 8 Pages.

Interdigital: "L2/3 Aspects of MPE Mitigation", 3GPP RAN WG2 Meeting #109-e, R2-2000178, 3rd Generation Partnership Project, Mobile Competence Centre, 650, Route Des Lucioles, F-06921 Sophia-Antipolis Cedex, France, vol. RAN WG2, No. e-meeting, Feb. 24, 2020-Mar. 6, 2020, Feb. 13, 2020, 5 Pages.

* cited by examiner

Multiple entry PHR MAC-CE (8 or more serving cells with configured uplink)

| $C_7$ | $C_6$ | $C_5$ | $C_4$ | $C_3$ | $C_2$ | $C_1$ | R |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| (P) | V | PH (Type 2, SpCell of the other MAC entity) ||||||
| R | R | $P_{CMAX,f,c}$ 1 ||||||
| (P) | V | PH (Type 1, PCell) ||||||
| R | R | $P_{CMAX,f,c}$ 2 ||||||
| (P) | V | PH (Type X, Serving Cell 1) ||||||
| R | R | $P_{CMAX,f,c}$ 3 ||||||
| ... |||||||| 
| (P) | V | PH (Type X, Serving Cell n) ||||||
| R | R | $P_{CMAX,f,c}$ m ||||||

Multiple entry PHR MAC-CE (fewer than 8 serving cells with configured uplink)

| $C_7$ | $C_6$ | $C_5$ | $C_4$ | $C_3$ | $C_2$ | $C_1$ | R |
|---|---|---|---|---|---|---|---|
| (P) | V | PH (Type 2, SpCell of the other MAC entity) |||||||
| R | R | $P_{CMAX,f,c}$ 1 |||||||
| (P) | V | PH (Type 1, PCell) |||||||
| R | R | $P_{CMAX,f,c}$ 2 |||||||
| (P) | V | PH (Type X, Serving Cell 1) |||||||
| R | R | $P_{CMAX,f,c}$ 3 |||||||
| ... ||||||||
| (P) | V | PH (Type X, Serving Cell n) |||||||
| R | R | $P_{CMAX,f,c}$ m |||||||

Single entry PHR MAC-CE

| (P) | R | PH (Type 1, PCell) |
|---|---|---|
| R | R | $P_{CMAX,f,c}$ |

420
PHR MAC-CE including one-bit field to indicate whether P-MPR is applied on a per cell basis

FIG. 4B

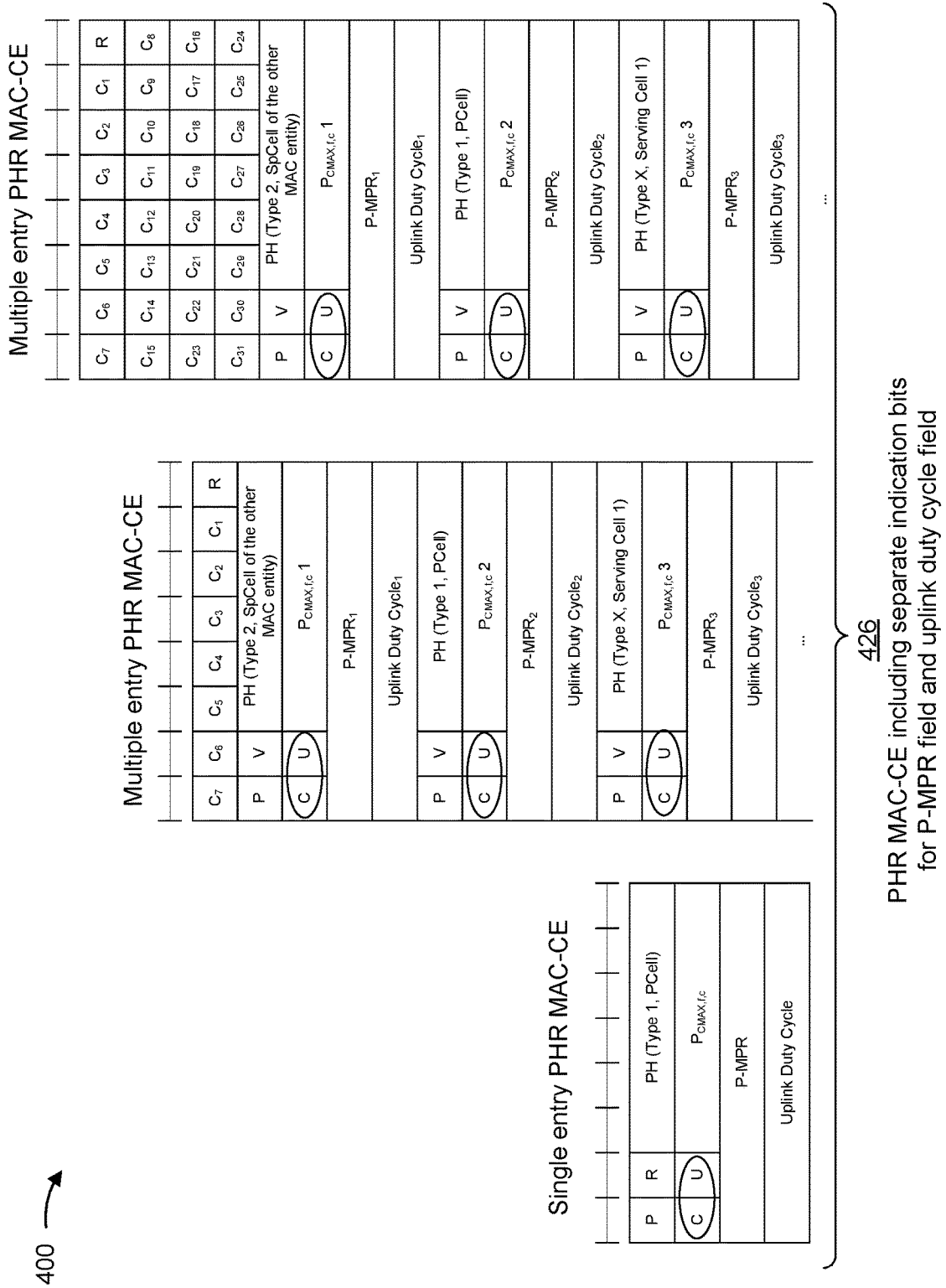

TECHNIQUES FOR SIGNALING MAXIMUM PERMISSIBLE EXPOSURE BACKOFF INDICATION

CROSS-REFERENCE TO RELATED APPLICATION

This application is a 371 national stage of Patent Cooperation Treaty (PCT) Application No. PCT/CN2020/083908 filed on Apr. 9, 2020, entitled "TECHNIQUES FOR SIGNALING MAXIMUM PERMISSIBLE EXPOSURE BACKOFF INDICATION," which is hereby expressly incorporated by reference herein.

FIELD OF THE DISCLOSURE

Aspects of the present disclosure generally relate to wireless communication and to techniques and apparatuses for signaling a maximum permissible exposure (MPE) backoff indication.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include: determining an average energy level radiated by the UE over a time period; determining whether the average energy level radiated by the UE over the time period exceeds a maximum permissible exposure (MPE) limit; and transmitting, to a base station, a medium access control (MAC) control element (MAC-CE) that includes information related to one or more of a power management maximum power reduction (P-MPR) applied at the UE or an uplink duty cycle in effect at the UE based at least in part on the average energy level radiated by the UE over the time period exceeding the MPE limit.

In some aspects, a UE for wireless communication may include a memory and one or more processors coupled to the memory. The memory and the one or more processors may be configured to: determine an average energy level radiated by the UE over a time period; determine whether the average energy level radiated by the UE over the time period exceeds an MPE limit; and transmit, to a base station, a MAC-CE that includes information related to one or more of a P-MPR applied at the UE or an uplink duty cycle in effect at the UE based at least in part on the average energy level radiated by the UE over the time period exceeding the MPE limit.

In some aspects, a non-transitory computer-readable medium may store one or more instructions for wireless communication. The one or more instructions, when executed by one or more processors of a UE, may cause the one or more processors to: determine an average energy level radiated by the UE over a time period; determine whether the average energy level radiated by the UE over the time period exceeds an MPE limit; and transmit, to a base station, a MAC-CE that includes information related to one or more of a P-MPR applied at the UE or an uplink duty cycle in effect at the UE based at least in part on the average energy level radiated by the UE over the time period exceeding the MPE limit.

In some aspects, an apparatus for wireless communication may include: means for determining an average energy level radiated by the apparatus over a time period; means for determining whether the average energy level radiated by the apparatus over the time period exceeds an MPE limit; and means for transmitting, to a base station, a MAC-CE that includes information related to one or more of a P-MPR applied at the apparatus or an uplink duty cycle in effect at the apparatus based at least in part on the average energy level radiated by the apparatus over the time period exceeding the MPE limit.

In some aspects, the MAC-CE includes at least one power headroom entry that has an individual bit to indicate whether the P-MPR applied at the UE has a zero value or a non-zero value for a corresponding cell.

In some aspects, the individual bit corresponds to a first bit in a first octet of the MAC-CE.

In some aspects, the MAC-CE includes at least one power headroom entry that includes two bits to indicate a value or a state representing multiple possible values associated with the P-MPR applied at the UE for a corresponding cell.

In some aspects, the two bits are set to a predefined value to indicate that the P-MPR applied at the UE has a zero value.

In some aspects, the at least one power headroom entry further includes a field to indicate the uplink duty cycle in effect at the UE.

In some aspects, the MAC-CE includes at least one power headroom entry that includes a first bit to indicate whether the MAC-CE includes a field to indicate a value of the P-MPR applied at the UE for a corresponding cell and a second bit to indicate whether the MAC-CE includes a field to indicate the uplink duty cycle in effect at the UE for the corresponding cell.

In some aspects, the MAC-CE includes one or more cell identifiers and one or more P-MPR entries that each include a first field to indicate a value of the P-MPR applied at the UE for a corresponding cell and a second field to indicate the uplink duty cycle in effect at the UE for the corresponding cell.

In some aspects, the MAC-CE includes a bitmap to indicate the one or more cell identifiers corresponding to the one or more P-MPR entries.

In some aspects, the MAC-CE explicitly indicates the one or more cell identifiers corresponding to the one or more P-MPR entries.

In some aspects, the MAC-CE includes at least one beam failure recovery entry that includes a field to indicate either a value of the P-MPR applied at the UE or the uplink duty cycle in effect at the UE for a corresponding cell.

In some aspects, the at least one beam failure recovery entry further includes a bit that has a first value to indicate that the field indicates the value of the P-MPR applied at the UE or a second value to indicate that the field indicates the uplink duty cycle in effect at the UE for the corresponding cell.

In some aspects, the MAC-CE is transmitted to periodically report the information related to the P-MPR applied at the UE or the uplink duty cycle in effect at the UE according to a periodic P-MPR reporting interval that is configured by the base station.

In some aspects, the MAC-CE is transmitted to the base station to periodically report the information related to the P-MPR applied at the UE or the uplink duty cycle in effect at the UE according to a P-MPR reporting interval that is based at least in part on the uplink duty cycle in effect at the UE.

In some aspects, the MAC-CE is transmitted based at least in part on one or more of a current value of the P-MPR applied at the UE satisfying a threshold, a difference between the current value and a previous value of the P-MPR applied at the UE satisfying a threshold, or information received from the base station triggering a report of the P-MPR applied at the UE.

In some aspects, the MAC-CE is transmitted based at least in part on expiration of a P-MPR prohibit timer configured by the base station.

In some aspects, the method performed by the UE may include transmitting, to the base station, a request for an uplink grant based at least in part on determining that the UE does not have an available uplink grant, wherein the request indicates that a P-MPR reporting event has occurred at the UE; and receiving the uplink grant, wherein the MAC-CE is transmitted using the uplink grant.

In some aspects, the UE may transmit, to the base station, a request for an uplink grant based at least in part on determining that the UE does not have an available uplink grant, wherein the request indicates that a P-MPR reporting event has occurred at the UE; and receive the uplink grant, wherein the MAC-CE is transmitted using the uplink grant.

In some aspects, the one or more instructions further cause the one or more processors of the UE to transmit, to the base station, a request for an uplink grant based at least in part on determining that the UE does not have an available uplink grant, wherein the request indicates that a P-MPR reporting event has occurred at the UE; and receive the uplink grant, wherein the MAC-CE is transmitted using the uplink grant.

In some aspects, the apparatus may include means for transmitting, to the base station, a request for an uplink grant based at least in part on determining that the UE does not have an available uplink grant, wherein the request indicates that a P-MPR reporting event has occurred at the UE; and means for receiving the uplink grant, wherein the MAC-CE is transmitted using the uplink grant.

In some aspects, the request for the uplink grant is transmitted using one or more of a physical uplink control channel resource or a random access channel procedure.

In some aspects, the MAC-CE is transmitted using one or more of a pre-scheduled uplink grant, a dynamic uplink grant, or an uplink grant associated with a random access response message received from the base station.

In some aspects, the method performed by the UE may include incrementing an MPE detection counter based at least in part on the average energy level radiated by the UE over the time period exceeding the MPE limit, wherein the MAC-CE is transmitted based at least in part on the MPE detection counter satisfying a threshold.

In some aspects, the UE may increment an MPE detection counter based at least in part on the average energy level radiated by the UE over the time period exceeding the MPE limit, wherein the MAC-CE is transmitted based at least in part on the MPE detection counter satisfying a threshold.

In some aspects, the one or more instructions further cause the one or more processors of the UE to increment an MPE detection counter based at least in part on the average energy level radiated by the UE over the time period exceeding the MPE limit, wherein the MAC-CE is transmitted based at least in part on the MPE detection counter satisfying a threshold.

In some aspects, the apparatus may include means for incrementing an MPE detection counter based at least in part on the average energy level radiated by the UE over the time period exceeding the MPE limit, wherein the MAC-CE is transmitted based at least in part on the MPE detection counter satisfying a threshold.

In some aspects, the method performed by the UE may include triggering an MPE detection timer based at least in part on incrementing the MPE detection counter; stopping the MPE detection timer based at least in part on one or more of the average energy level radiated by the UE failing to exceed the MPE limit over a subsequent time period or the base station deactivating a cell in which the average energy level radiated by the UE exceeded the MPE limit; and resetting the MPE detection counter based at least in part on determining that a condition is satisfied.

In some aspects, the UE may trigger an MPE detection timer based at least in part on incrementing the MPE detection counter; stop the MPE detection timer based at least in part on one or more of the average energy level radiated by the UE failing to exceed the MPE limit over a subsequent time period or the base station deactivating a cell in which the average energy level radiated by the UE exceeded the MPE limit; and reset the MPE detection counter based at least in part on determining that a condition is satisfied.

In some aspects, the one or more instructions further cause the one or more processors of the UE to trigger an MPE detection timer based at least in part on incrementing the MPE detection counter; stop the MPE detection timer based at least in part on one or more of the average energy level radiated by the UE failing to exceed the MPE limit over a subsequent time period or the base station deactivating a cell in which the average energy level radiated by the UE exceeded the MPE limit; and reset the MPE detection counter based at least in part on determining that a condition is satisfied.

In some aspects, the apparatus may include means for triggering an MPE detection timer based at least in part on incrementing the MPE detection counter; means for stopping the MPE detection timer based at least in part on one or more of the average energy level radiated by the UE failing to exceed the MPE limit over a subsequent time period or the base station deactivating a cell in which the average energy level radiated by the UE exceeded the MPE limit; and means for resetting the MPE detection counter based at least in part on determining that a condition is satisfied.

In some aspects, the condition includes one or more of the MPE detection timer expiring, the average energy level radiated by the UE failing to exceed the MPE limit over the subsequent time period, the base station deactivating the cell in which the average energy level radiated by the UE exceeded the MPE limit, or the base station reconfiguring the MPE detection timer or the MPE detection counter.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4A-4H are diagrams illustrating one or more examples of signaling an MPE backoff indication, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
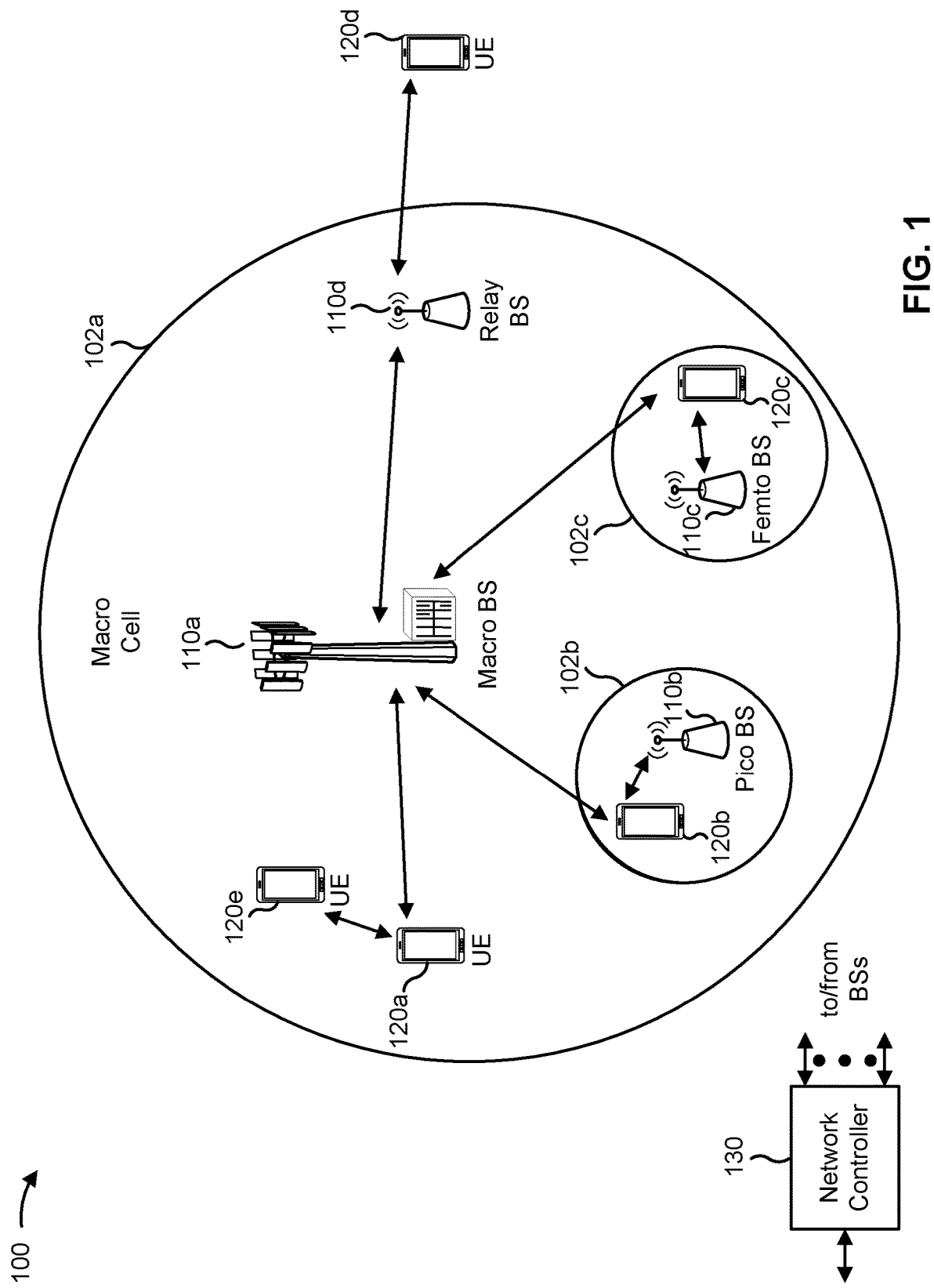
FIG. 1 is a diagram illustrating an example of a wireless communication network, in accordance with various aspects of the present disclosure.

FIG. 1 is a diagram illustrating a wireless network 100 in which aspects of the present disclosure may be practiced.

The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
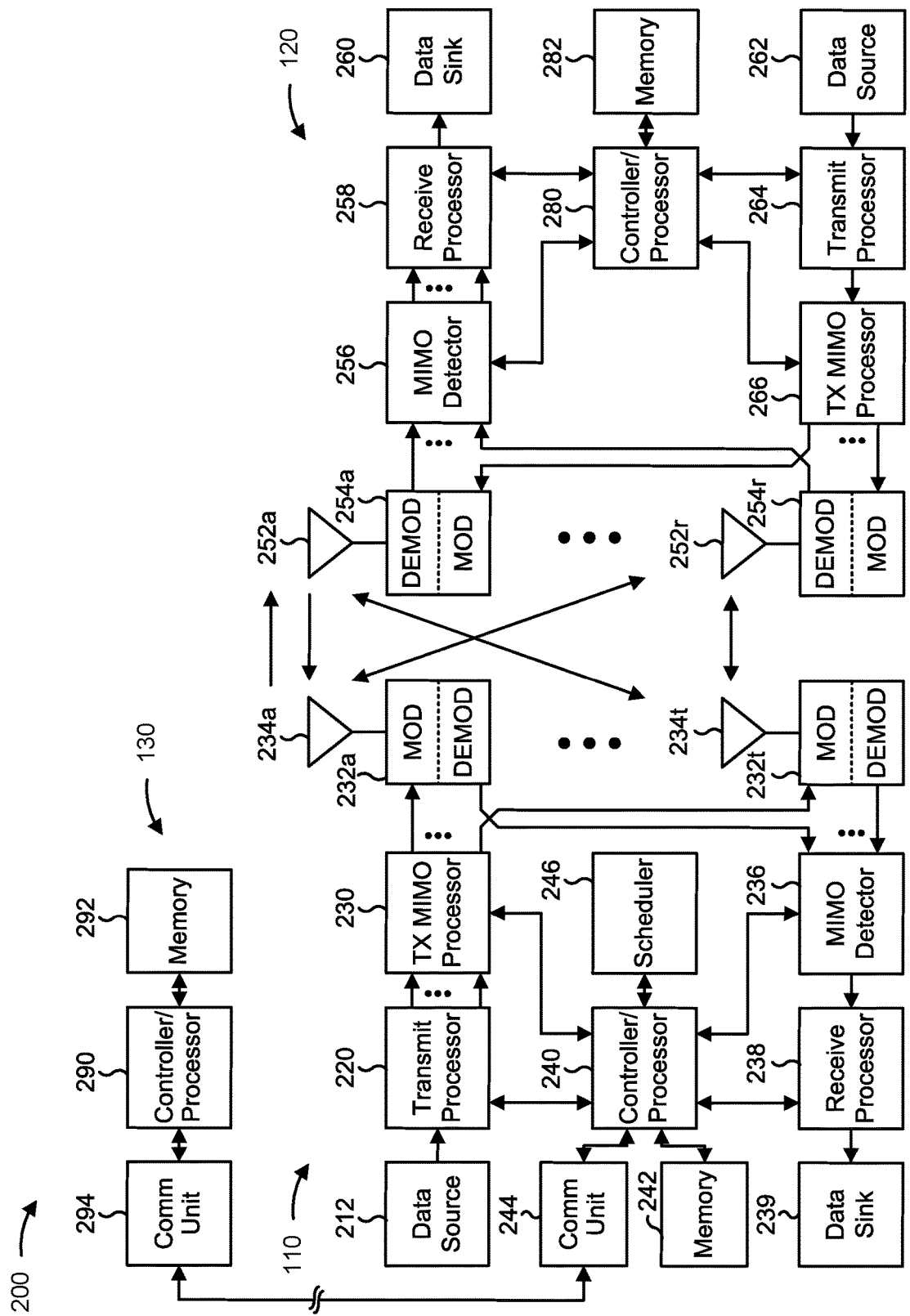
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with signaling a maximum permissible exposure (MPE) backoff indication, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5 and/or other processes as described herein. A scheduler 246 may schedule UEs for data transmission on the downlink and/or uplink.

In some aspects, UE 120 may include means for determining an average energy level radiated by UE 120 over a time period, means for determining whether the average energy level radiated by UE 120 over the time period exceeds an MPE limit, means for transmitting, to base station 110, a medium access control (MAC) control element (MAC-CE) that includes information related to one or more of a power management maximum power reduction (P-MPR) applied at UE 120 or an uplink duty cycle in effect at UE 120 based at least in part on the average energy level radiated by UE 120 over the time period exceeding the MPE limit, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
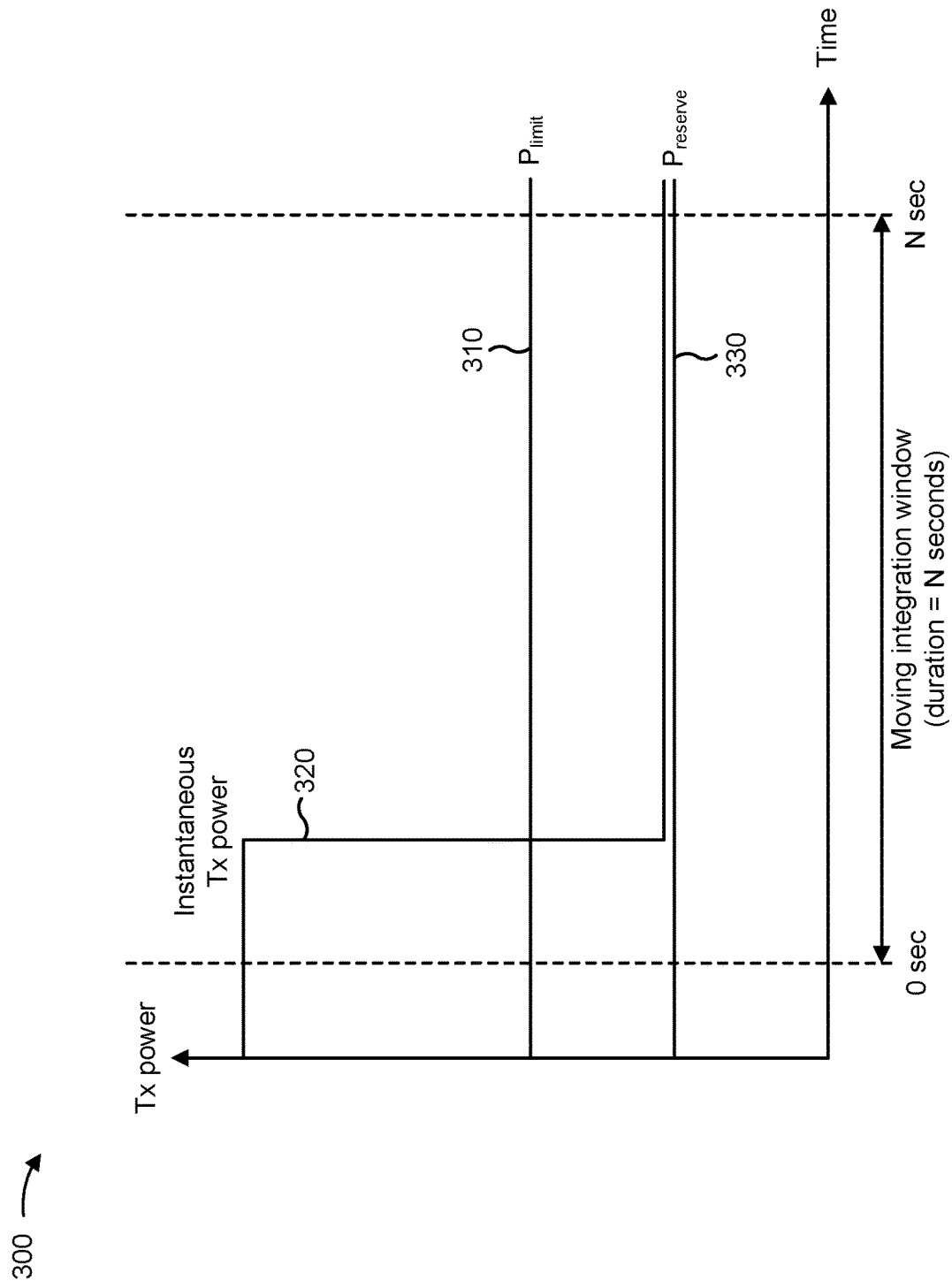
FIG. 3 is a diagram illustrating an example of a UE adapting transmit power over a moving integration window to satisfy a maximum permissible exposure (MPE) limit, in accordance with various aspects of the present disclosure.

FIG. 3 is a diagram illustrating an example 300 of a UE adapting transmit power over a moving integration window to satisfy a maximum permissible exposure (MPE) limit, in accordance with various aspects of the present disclosure.

Because UEs may emit radio frequency (RF) waves, microwaves, and/or other radiation, UEs are generally subject to regulatory RF safety requirements that set forth specific guidelines, or MPE limits, that constrain various operations that the UEs can perform. For example, RF emissions may generally increase when a UE is transmitting, and the RF emissions may further increase in cases where the UE is performing frequent transmissions, high-power transmissions, and/or the like. Accordingly, because frequent and/or high-power transmission may lead to significant RF emissions, regulatory agencies (e.g., the Federal Communications Commission (FCC) in the United States)

may provide information related to acceptable RF radiation exposure when UEs are communicating using different radio access technologies.

For example, when a UE is communicating using radio access technologies that operate in a frequency range below 6 GHz, the applicable RF exposure parameter is a specific absorption rate (SAR), which refers to a rate at which the human body absorbs energy when exposed to RF energy (e.g., power absorbed per unit of mass, which may be expressed according to watts per kilogram (W/kg)). In particular, SAR requirements generally specify that overall radiated power by a UE is to remain under a certain level to limit heating that may occur when RF energy is absorbed. In another example, when a UE is communicating using a radio access technology that operates in a high frequency range, such as a millimeter wave (mmW) frequency range, the applicable RF exposure parameter is power density, which may be regulated to limit heating of the UE and/or nearby surfaces.

Accordingly, UEs generally have to satisfy MPE limits, which are typically regulatory requirements that are defined in terms of aggregate exposure that is averaged over a certain time period (e.g., a moving integration window). For example, as shown in FIG. 3, and by reference number 310, a UE may be subject to an average power limit ($P_{limit}$) at which an MPE limit would be satisfied if the UE were to transmit substantially continuously over a moving integration window including a time period of N seconds (e.g., 100 seconds). Accordingly, as shown by reference number 320, the UE can use an instantaneous transmit power that exceeds the average power limit for a period of time, provided that the average energy level radiated by the UE over the moving integration window remains under the average power limit at which the MPE limit is satisfied. For example, the UE may be permitted to transmit at a maximum transmit power at the start of the moving integration window, and the UE may subsequently reduce the instantaneous transmit power until the moving integration window ends in order to ensure that the MPE limit on aggregate exposure is satisfied over the entire moving integration window. In general, as shown by reference number 330, the UE may reduce the instantaneous transmit power to a reserve power level (Preserve), which is a minimum transmit power level needed to maintain a link with a base station.

Accordingly, in order to satisfy an MPE limit, the UE may generally measure an average energy level radiated by the UE over a time period (e.g., a moving integration window), and may apply a power management maximum power reduction (P-MPR) to reduce the maximum transmission power that can be output by the UE if the UE determines that the maximum transmission power needs to be reduced to satisfy the MPE limit. However, applying a P-MPR to reduce the maximum transmission power that can be output by the UE may potentially lead to degraded uplink performance. For example, the power reduction may impact coverage for the UE or potentially cause radio link failure or a connection release because uplink transmissions by the UE may have insufficient power to reach the base station. Furthermore, because a wireless network may not be configured to provide an explicit indication from the UE regarding a reduction in transmission power applied at the UE, a base station in communication with the UE may be unaware of how much remaining energy budget is available to the UE within the moving integration window and/or an extent to which the UE may have reduced the maximum transmission power. As a result, the base station cannot take appropriate action to adapt scheduling to help the UE maintain the uplink connection. These issues may arise even in cases where the UE signals a maximum uplink duty cycle, which is associated with a maximum percentage of symbols that can be scheduled for uplink transmission during a particular time period (e.g., one second) in order to ensure compliance with any applicable electromagnetic power density exposure requirements provided by regulatory bodies. In particular, because the MPE limit can be exceeded at different power levels, the UE may still need to apply a P-MPR in extreme conditions even if the base station adapts scheduling for the UE according to the uplink duty cycle preference signaled by the UE.

Some aspects described herein relate to techniques and apparatuses to enable signaling an MPE backoff indication from a UE to a base station. For example, in some aspects, a UE may determine whether an average energy level radiated by the UE over a time period exceeds an MPE limit, and the UE may apply a P-MPR to reduce a maximum transmission power and/or an uplink duty cycle to reduce how often the UE transmits in a given duration if the average energy level radiated by the UE over the time period exceeds the MPE limit. Furthermore, in some aspects, the UE may transmit, to a base station, a medium access control (MAC) control element (MAC-CE) that includes information related to the P-MPR applied at the UE and/or the uplink duty cycle in effect at the UE (e.g., on a periodic basis, when a triggering event occurs, and/or the like). In this way, the MAC-CE may provide the base station with a dynamic indication of the P-MPR applied at the UE and/or a dynamic indication of the uplink duty cycle in effect at the UE, which may enable the base station to adapt scheduling for the UE based at least in part on the P-MPR applied at the UE and/or the uplink duty cycle in effect at the UE. In this way, the base station may schedule the UE more efficiently, which improves performance, conserves network resources that may otherwise be wasted reestablishing an uplink connection that may have been dropped due to the UE reducing the maximum uplink transmission power, and/or the like.

As indicated above, FIG. 3 is provided as an example. Other examples may differ from what is described with regard to FIG. 3.

Figure 4A:
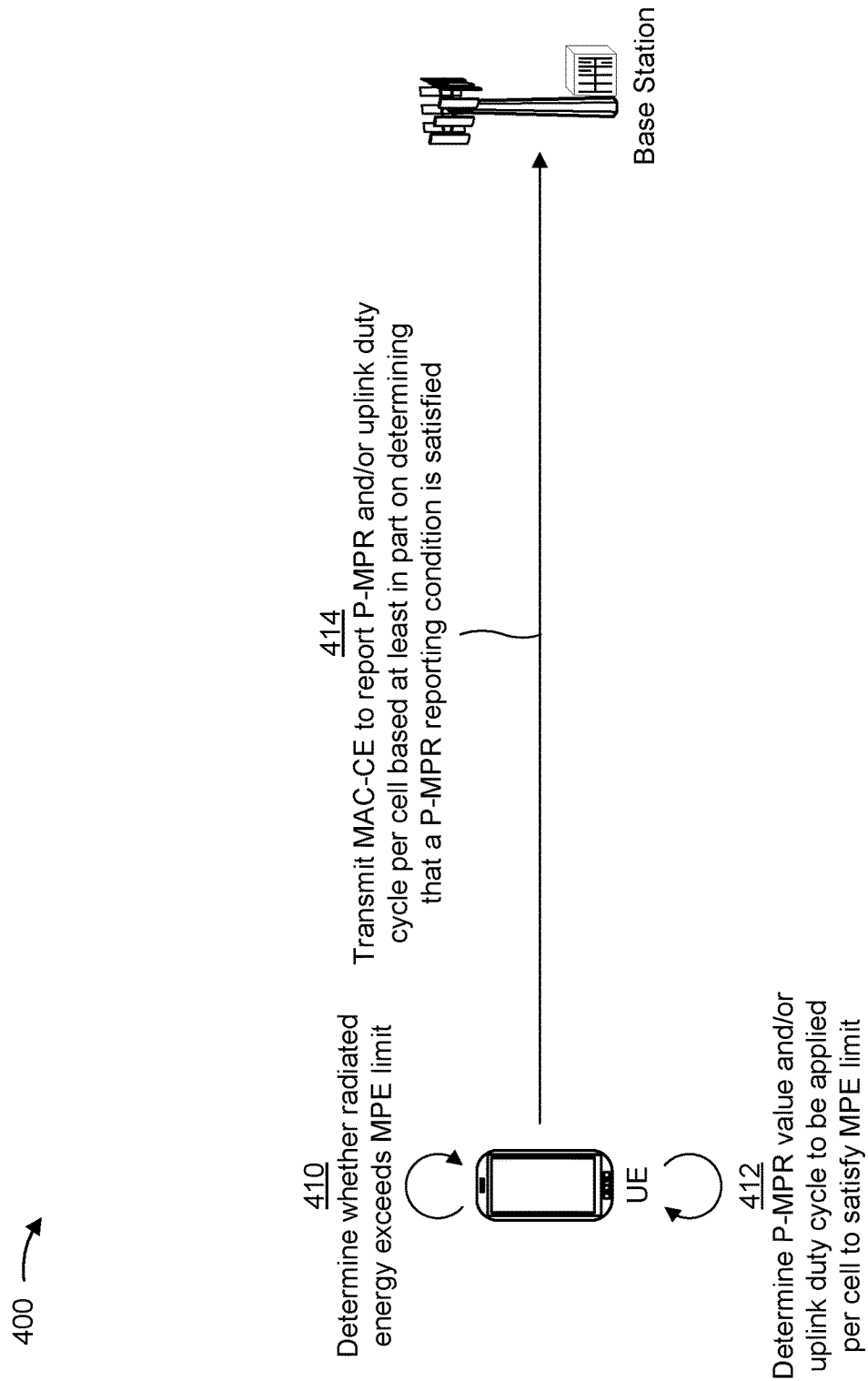

FIGS. 4A-4H are diagrams illustrating one or more examples 400 of signaling an MPE backoff indication, in accordance with various aspects of the present disclosure. As shown in FIG. 4A, example(s) 400 include a UE (e.g., UE 120) communicating with a base station (e.g., base station 110) in a wireless network (e.g., wireless network 100). Furthermore, as described herein, the UE may transmit a MAC-CE to the base station (e.g., at periodic intervals, when a triggering event occurs, and/or the like) to dynamically indicate one or more communication parameters that relate to an MPE backoff applied at the UE. For example, as shown in FIGS. 4B-4H, the MAC-CE may have a structure to dynamically indicate an actual P-MPR value applied at the UE and/or an uplink duty cycle that is in effect at the UE (e.g., to satisfy an MPE limit).

As shown in FIG. 4A, and by reference number 410, the UE may determine whether an average energy level radiated by the UE over a time period exceeds an MPE limit. For example, as described above, the UE may measure or otherwise determine the average energy level radiated by the UE over a moving integration window that covers a particular duration in order to determine whether the average energy level radiated by the UE over a moving integration window satisfies (e.g., is less than or equal to) an MPE limit or exceeds the MPE limit that defines acceptable RF radiation exposure when the UE is performing transmission operations. In some aspects, in order to determine whether the average energy level radiated by the UE satisfies or exceeds the MPE limit, the UE may utilize an MPE detection algorithm that is based at least in part on an MPE detection counter and an MPE detection timer. For example, in cases where the UE detects an MPE issue (e.g., based at least in part on the average energy level radiated by the UE exceeding the MPE limit over a particular time period), the UE may increment the MPE detection counter and trigger (e.g., start or restart) the MPE detection timer. Furthermore, the UE may stop (e.g., pause) the MPE detection timer if the MPE issue is successfully resolved (e.g., the average energy level radiated by the UE over a current integration window does not exceed the MPE limit) or the base station deactivates a cell in which the MPE issue was detected. Accordingly, if the MPE detection counter reaches a maximum value, the UE may trigger an MPE backoff reporting procedure to indicate a P-MPR value and/or dynamic uplink duty cycle applied by the UE to ensure compliance with the MPE limit. Additionally, or alternatively, the UE may reset the MPE detection counter to zero if an MPE reset condition is satisfied. For example, in some aspects, the MPE reset condition may be satisfied if the MPE detection timer expires, the MPE issue is successfully resolved by the average energy level radiated by the UE not exceeding the MPE limit over a subsequent time period, the base station deactivating the cell in which the average energy level radiated by the UE exceeded the MPE limit, the base station reconfiguring the MPE detection timer and/or the MPE detection counter, and/or the like.

As further shown in FIG. 4A, and by reference number 412, the UE may determine a P-MPR value and/or an uplink duty cycle to be applied per cell configured for the UE in order to satisfy the MPE limit. For example, in cases where the UE does not detect an MPE issue (e.g., the average radiated power in a current time period does not exceed the MPE limit), the P-MPR applied at the UE may have a zero value (e.g., no P-MPR is applied at the UE), the uplink duty cycle in effect at the UE may be configured based at least in part on the maximum uplink duty cycle supported by the UE, and/or the like. Alternatively, in cases where the UE does detect an MPE issue, the P-MPR applied at the UE may have a non-zero value, the uplink duty cycle in effect at the UE may be reduced, and/or the like in order to reduce the total radiated power to a level that satisfies the MPE limit.

As further shown in FIG. 4A, and by reference number 414, the UE may transmit, to the base station, a MAC-CE to report information related to the P-MPR applied at the UE and/or the uplink duty cycle in effect at the UE. For example, in some aspects, the MAC-CE may be transmitted to report the P-MPR applied at the UE and/or the uplink duty cycle in effect at the UE on a per cell basis, as MPE issues may vary from one cell to another (e.g., as described in further detail below with reference to FIGS. 4B-4H). Furthermore, as shown in FIG. 4A, the UE may transmit the MAC-CE to report the information related to the P-MPR applied at the UE and/or the uplink duty cycle in effect at the UE based at least in part on determining that a P-MPR reporting condition is satisfied. For example, in some aspects, the UE may transmit the MAC-CE when the MPE detection counter satisfies a threshold (e.g., reaches a maximum value).

Additionally, or alternatively, the UE may transmit the MAC-CE to report the information related to the P-MPR applied at the UE and/or the uplink duty cycle in effect at the UE on a periodic basis. For example, the UE may be configured to periodically report the current P-MPR applied at the UE and/or the current uplink duty cycle in effect at the UE according to a periodic interval configured by the base station, which may have a different value or the same value as a legacy phr-PeriodicTimer parameter that defines an interval for the UE to report a power headroom. Additionally, or alternatively, the periodic interval may be defined as an applicability period associated with the current uplink duty cycle in effect at the UE. For example, the uplink duty cycle may generally define on and off periods in which the UE performs and does not perform uplink transmissions, whereby the UE may transmit the MAC-CE to report the information related to the current P-MPR and/or uplink duty cycle only during the on periods in which the UE performs uplink transmissions. In this way, the periodicity of the MAC-CE used to report the information related to the P-MPR applied at the UE and/or the uplink duty cycle in effect at the UE may inform the base station about the applicability period associated with the current uplink duty cycle at the UE.

Additionally, or alternatively, the UE may transmit the MAC-CE to report the information related to the P-MPR applied at the UE and/or the uplink duty cycle in effect at the UE based at least in part on one or more triggering events. For example, in some aspects, the UE may transmit the MAC-CE when the P-MPR has a value that satisfies (e.g., equals or exceeds) a threshold, when a difference between a current value of the P-MPR applied at the UE and a previous value of the P-MPR applied at the UE satisfies (e.g., is higher than or lower than) a threshold, when the base station triggers a one-shot report of the current P-MPR value and/or uplink duty cycle from one or more cells (e.g., via downlink control information scheduling the report), and/or the like.

Furthermore, in some aspects, the UE may transmit the MAC-CE based at least in part on determining that a prohibit timer (e.g., a hysteresis timer) has expired. For example, in some aspects, the prohibit timer may have a duration that is configured by the base station to prevent the UE from excessively reporting the current P-MPR and/or uplink duty cycle (e.g., to reduce network overhead). Accordingly, when the UE transmits a MAC-CE to report a current P-MPR applied at the UE and/or a current uplink duty cycle in effect at the UE, the prohibit timer may be started and the UE may refrain from transmitting any additional MAC-CE to report a current P-MPR applied at the UE and/or a current uplink duty cycle in effect at the UE while the prohibit timer has not expired. Furthermore, the UE may transmit a periodic and/or event-triggered MAC-CE to report the current P-MPR applied at the UE and/or the current uplink duty cycle in effect at the UE after the prohibit timer has expired.

In some aspects, in order to transmit the MAC-CE that includes the information related to the current P-MPR applied at the UE and/or the current uplink duty cycle in effect at the UE, the UE may generally need to have an uplink grant scheduling or otherwise permitting an uplink transmission by the UE. Furthermore, because the current P-MPR applied at the UE and/or the current uplink duty cycle in effect at the UE may relate to delay-sensitive MPE issues that need to be satisfied in order to comply with regulatory requirements, the UE may be configured to use an immediately available uplink grant and/or immediately initiate a procedure to obtain an uplink grant when a P-MPR and/or uplink duty cycle reporting condition is satisfied.

For example, in cases where the UE has an available uplink grant, the UE may use the available uplink grant to transmit the MAC-CE that includes the information related to the current P-MPR applied at the UE and/or the current uplink duty cycle in effect at the UE without any additional signaling. For example, in some aspects, the available uplink grant may be a pre-scheduled uplink grant (e.g., a type-1 or type-2 configured grant), a dynamic grant received via a physical downlink control channel (PDCCH), an uplink grant provided in a random access response (RAR) message associated with a two-step or four-step random access channel (RACH) procedure, and/or the like. Otherwise, in cases where the UE does not have an available uplink grant, the UE may transmit a request for the uplink grant to the base station in order to transmit the MAC-CE that includes the information related to the current P-MPR applied at the UE and/or the current uplink duty cycle in effect at the UE without passively waiting for the uplink grant. In particular, the request may generally inform the base station that a P-MPR and/or uplink duty cycle reporting event has occurred and that the UE needs an uplink grant to transmit the MAC-CE to provide the base station with the information related to the P-MPR and/or uplink duty cycle at the UE. For example, in some aspects, the request can be a shared scheduling request, a dedicated scheduling request configured by the base station, and/or the like transmitted using a physical uplink control channel (PUCCH) resource configured for the UE, or the request may be transmitted by initiating a two-step or four-step RACH procedure (e.g., if a PUCCH resource and/or the scheduling request resource is not configured for the UE). For example, as described above, a RAR message associated with a RACH procedure (e.g., msgB in a two-step RACH procedure or msg2 in a four-step RACH procedure) typically includes an uplink grant, whereby the UE may transmit the UE in an uplink message associated with the RACH procedure (e.g., a msgA payload in a two-step RACH procedure, a msg3 in a four-step RACH procedure, and/or the like).

Accordingly, the MAC-CE transmitted by the UE may generally indicate information related to a current energy budget at the UE according to the P-MPR value (if any) applied at the UE and/or the current uplink duty cycle in effect at the UE, which may enable the base station to mitigate MPE issues experienced at the UE. For example, in some aspects, the base station may refrain from scheduling uplink transmissions in one or more cells in which the UE is experiencing MPE issues, may schedule the UE to transmit less often, may modify uplink grants to reduce an uplink transmit power to be used by the UE (e.g., by scheduling a narrower uplink bandwidth or a lower modulation order), and/or the like. In general, to enable more efficient scheduling and/or MPE mitigation by the base station, the MAC-CE may include information indicating whether a P-MPR is applied at the UE, a value of the P-MPR (if any) applied at the UE, the current uplink duty cycle in effect at the UE, and/or the like. Accordingly, as described in further detail below with reference to FIGS. 4B-4H, the MAC-CE can be configured in various ways to convey the information needed to enable more efficient scheduling and/or MPE mitigation by the base station.

For example, as shown in FIG. 4B, and by reference number 420, the UE may configure the MAC-CE as a power headroom (PHR) MAC-CE that includes a one-bit field to indicate whether a P-MPR is applied at the UE on a per cell basis. For example, as shown in FIG. 4B, the PHR MAC-CE may be a single-entry PHR MAC-CE that includes information related to a power headroom for a primary cell (PCell) relative to a maximum configured power ($P_{cmax}$) for the UE, a multiple-entry PHR MAC-CE that may be used when there are fewer than eight serving cells with a configured uplink for the UE, or a multiple-entry PHR MAC-CE that may be used when there are eight or more (up to thirty-two) serving cells with a configured uplink for the UE.

In general, as shown in FIG. 4B, the single-entry PHR MAC-CE and the multiple-entry PHR MAC-CE formats may be configured to include an indicator bit (e.g., a P bit, circled in FIG. 4B), which may indicate whether the UE has applied a P-MPR on a per cell basis. For example, the PHR MAC-CE formats each include one or more power headroom entries that correspond to respective serving cells, and each power headroom entry may include an individual bit to indicate whether the UE has applied a P-MPR for the corresponding serving cell. For example, the individual bit may be set to a first value (e.g., one) to indicate that the UE has applied a non-zero P-MPR for the corresponding serving cell, or the individual bit may be set to a second value (e.g., zero) to indicate that the P-MPR for the corresponding serving cell has a zero value (e.g., no P-MPR is applied for the corresponding serving cell). Accordingly, the individual bit may be set to the first value to indicate that the UE is experiencing an MPE issue in the corresponding serving cell or to the second value to indicate that the UE is not experiencing an MPE issue in the corresponding serving cell. Furthermore, as shown, the individual indicator bit may correspond to a first bit in a first octet in the case of a single-entry PHR MAC-CE.

Figure 4C:
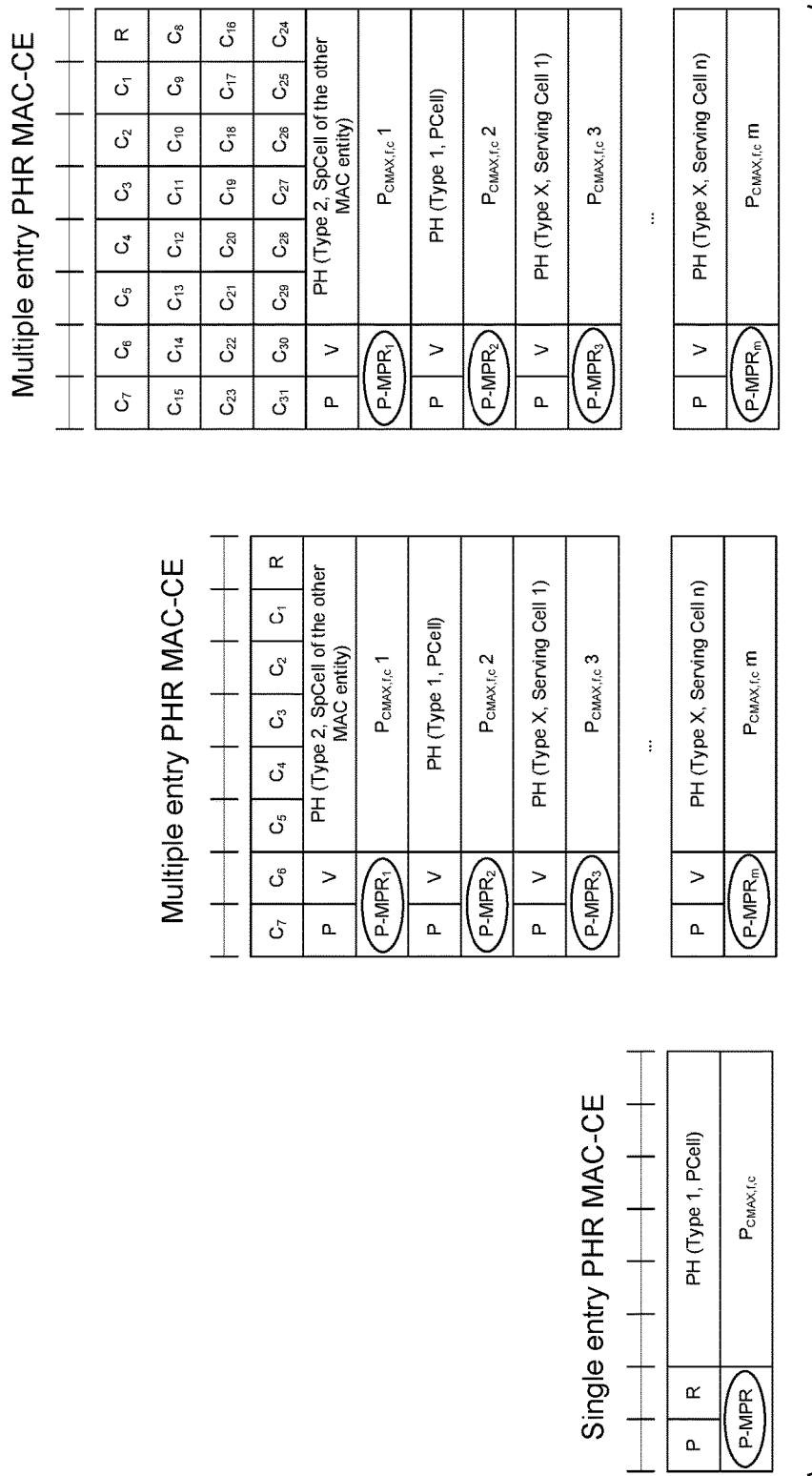

Additionally, or alternatively, as shown in FIG. 4C, the PHR MAC-CE formats shown in FIG. 4B may be extended to convey additional information related to the P-MPR value applied at the UE on a per cell basis. For example, as shown by reference number 422, the extended PHR MAC-CE may include a two-bit P-MPR field to represent the actual P-MPR value or P-MPR state per cell. In this case, two reserved (R) bits in each power headroom entry may be used as the two-bit P-MPR field, which may represent four possible values for the P-MPR applied at the UE per cell. Additionally, or alternatively, the four possible values for the two-bit P-MPR field may each correspond to a P-MPR state that groups multiple P-MPR values. For example, eight P-MPR values may be grouped into four states that each include two P-MPR values, and the two-bit P-MPR field may represent one of the four states. Additionally, or alternatively, one possible value for the P-MPR field (e.g., '00') may be used to indicate that the UE has not applied a P-MPR (or has applied a P-MPR having a zero or null value) for the corresponding cell, and the other three values for the P-MPR field may represent actual P-MPR values or P-MPR states that include multiple P-MPR values.

Figure 4D:
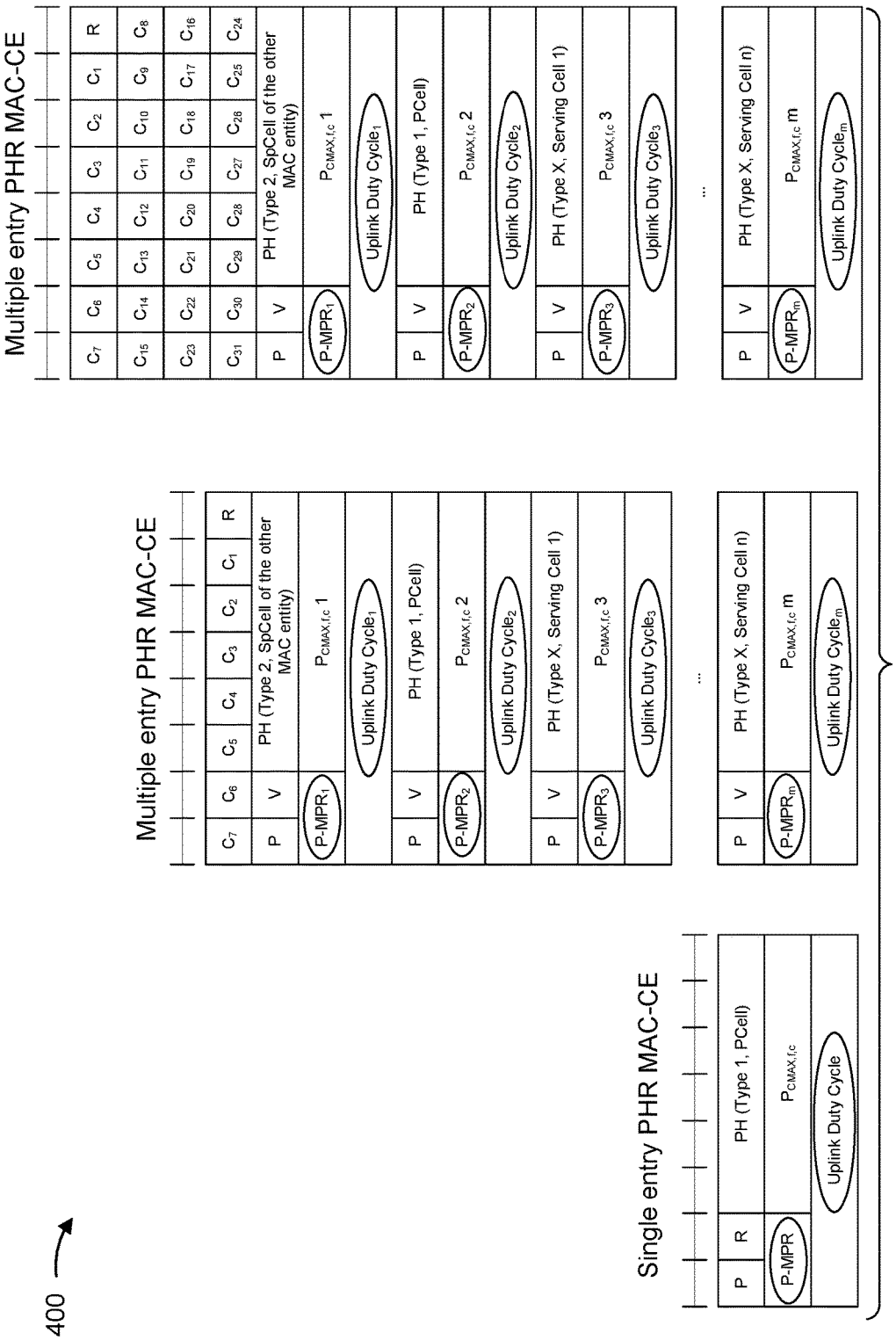

Additionally, or alternatively, as shown in FIG. 4D, the PHR MAC-CE formats shown in FIGS. 4B-4C may be further extended to convey information related to the current uplink duty cycle applied at the UE on a per cell basis. For example, as shown by reference number 424, the extended PHR MAC-CE may include a two-bit P-MPR field to represent the actual P-MPR value or P-MPR state per cell (e.g., in a similar manner as shown in FIG. 4C), and the extended PHR MAC-CE may include an additional field to represent the current uplink duty cycle in effect at the UE per cell. For example, as shown in FIG. 4D, the field for the current uplink duty cycle may be provided in an octet that follows an octet containing the P-MPR field and the $P_{cmax}$ value for the corresponding cell. In this way, when the PHR MAC-CE is configured as shown in FIG. 4D, the PHR MAC-CE may be used to simultaneously convey the actual P-MPR value and current uplink duty cycle per cell, and thereby efficiently report all relevant power information to the base station in a single MAC-CE transmission.

Additionally, or alternatively, as shown in FIG. 4E, the PHR MAC-CE formats shown in FIGS. 4B-4D may be further extended to include separate P-MPR and uplink duty cycle fields and separate indication bits to indicate whether corresponding values are reported in the P-MPR and/or uplink duty cycle fields. For example, as shown by reference number 426, the extended PHR MAC-CE formats may include the P-MPR field and the uplink duty cycle field in separate octets that follow an octet containing the $P_{cmax}$ value for the corresponding cell. Furthermore, as shown in FIG. 4E, the octet containing the $P_{cmax}$ value for the corresponding cell includes two indication bits that may indicate whether the corresponding values are reported in the P-MPR and/or uplink duty cycle fields. For example, the indication bits may include a C bit that is set to zero (0) to indicate that the UE is not applying a P-MPR for the corresponding cell, or to one (1) to indicate that the UE is applying a P-MPR for the corresponding cell such that the P-MPR field includes the actual P-MPR value applied at the UE for the corresponding cell. In a similar respect, the indication bits may include a U bit that is set to zero to indicate that the UE is not reporting an uplink duty cycle for the corresponding cell, or to one to indicate that the UE is reporting an uplink duty cycle in effect for the corresponding cell in the uplink duty cycle field. In this way, the PHR MAC-CE may include the actual P-MPR value and/or uplink duty cycle for one or more cells, and the UE may refrain from including the actual P-MPR value and/or uplink duty cycle in the PHR MAC-CE for one or more other cells (e.g., based at least in part on configuration information received from the base station indicating whether to report the actual P-MPR value and/or uplink duty cycle for one or more cells).

Figure 4F:
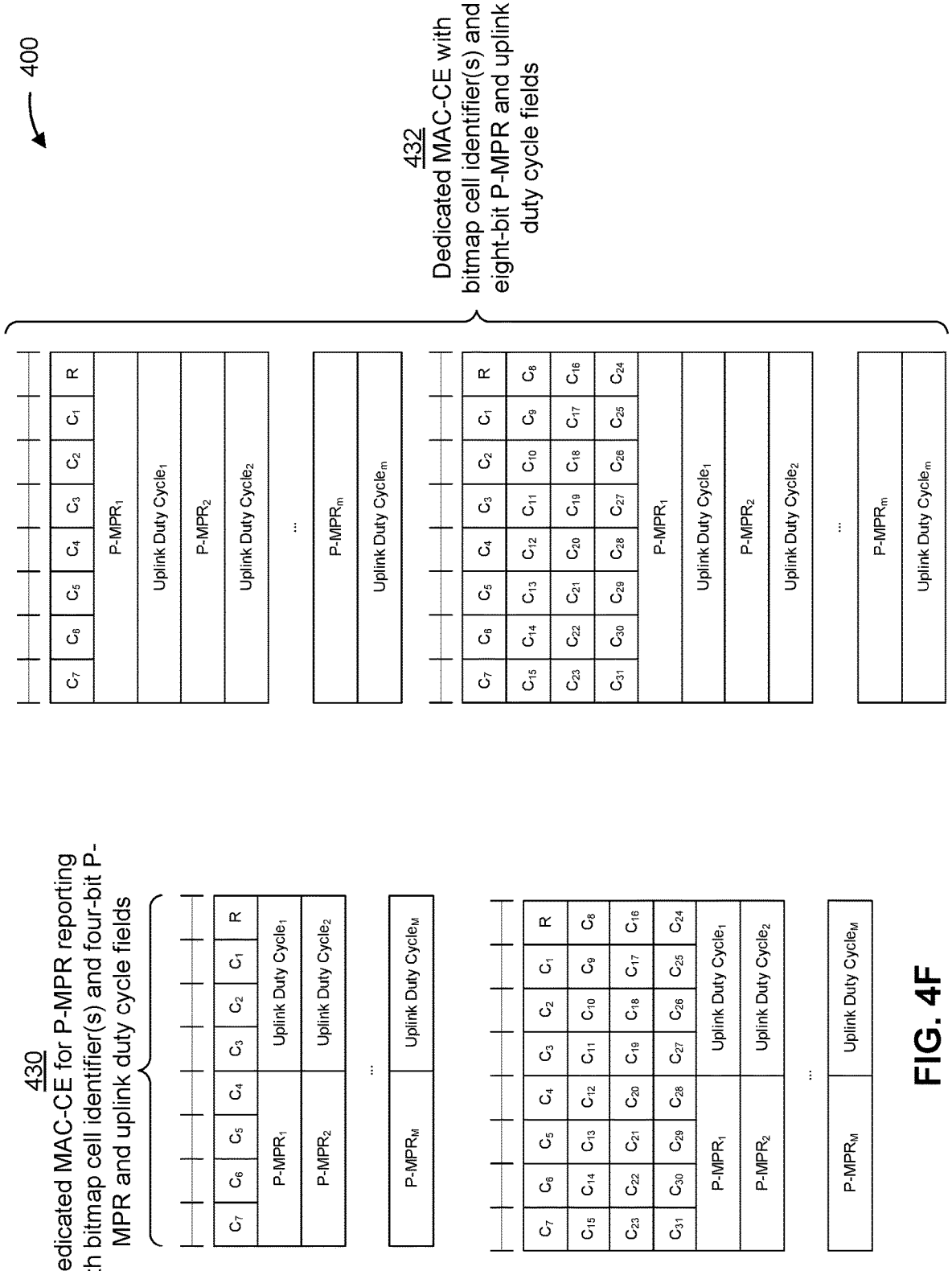
Figure 4G:
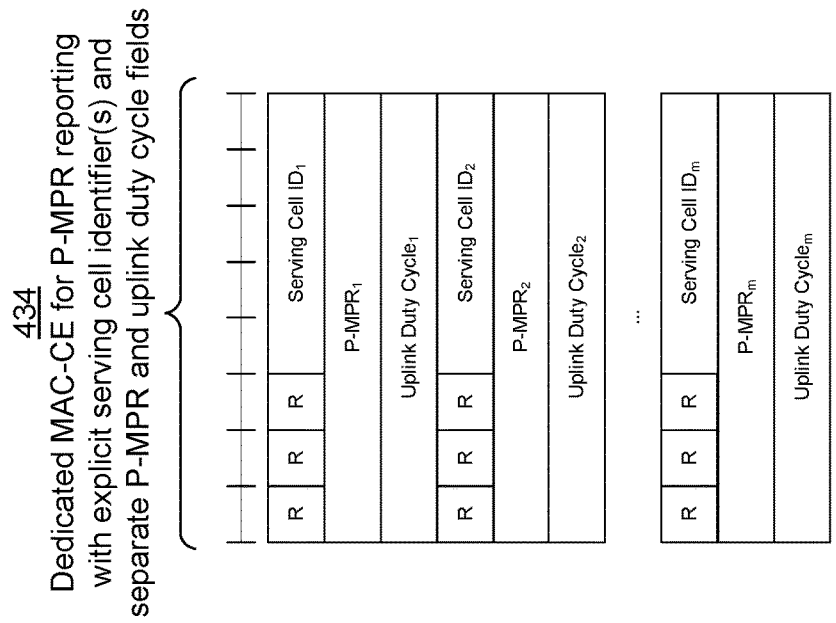

In some aspects, as shown in FIGS. 4F-4G, the MAC-CE used to report the information related to the P-MPR applied at the UE and/or the current uplink duty cycle in effect at the UE may be formatted as a MAC-CE dedicated to P-MPR reporting. For example, as shown in FIG. 4F, and by reference number 430, the dedicated P-MPR MAC-CE may include a one-byte bitmap that indicates one or more (up to 8) serving cell identifiers, and each octet following the bitmap may include a four-bit P-MPR field and a four-bit uplink duty cycle field to represent up to sixteen different values for the P-MPR value and the uplink duty cycle for a corresponding serving cell. Alternatively, as shown by reference number 432, the dedicated P-MPR MAC-CE may include a four-byte bitmap that indicates one or more serving cell identifiers, and the dedicated P-MPR MAC-CE may further include separate eight-bit fields to represent up to $2^8$ different values for the P-MPR value and the uplink duty cycle for each serving cell. Alternatively, as shown in FIG. 4G, and by reference number 434, the dedicated P-MPR MAC-CE may include one or more explicit serving cell identifiers and separate P-MPR and uplink duty cycle fields for each serving cell identifier. For example, the separate P-MPR and uplink duty cycle fields may be eight-bit fields (e.g., in separate octets, as shown in FIG. 4G), separate four-bit fields in the same octet, and/or the like.

Figure 4H:
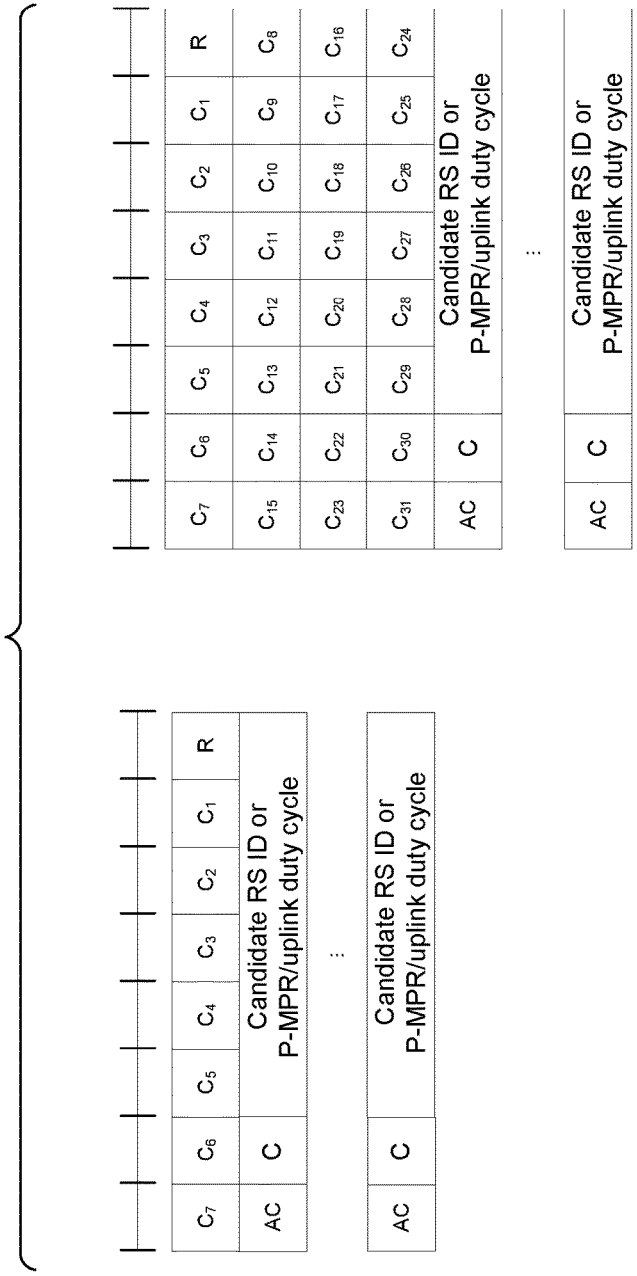

Additionally, or alternatively, as shown in FIG. 4H, and by reference number 440, the UE may configure a beam failure recovery (BFR) MAC-CE to report information related to an MPE backoff indication. For example, as shown in FIG. 4H, the BFR MAC-CE may include a one-byte bitmap or a four-byte bitmap to identify one or more serving cells for which the UE is reporting information via the BFR MAC-CE. In addition, the BFR MAC-CE may include one or more BFR entries, each of which includes a pair of indication bits and an information field that may include a candidate reference signal identifier, a P-MPR value, or an uplink duty cycle value for a corresponding serving cell depending on a state of the pair of indication bits. For example, in cases where the first (e.g., 'AC') indication bit is set to a first value (e.g., one), the information field may include a candidate reference signal identifier having a best beam measurement (e.g., a highest reference signal received power) such that the base station can use the information in the BFR MAC-CE to enable beam failure recovery for the UE. Alternatively, in cases where the first indication bit is set to a second value (e.g., zero), the information field may include either a P-MPR value or an uplink duty cycle value for the corresponding serving cell depending on a value of the second (e.g., 'C') indication bit. For example, the information field may include a P-MPR value if the second indication bit is set to a first value or an uplink duty cycle value if the second indication bit is set to a second value. In this way, the UE may flexibly use the BFR MAC-CE to report the P-MPR value and/or uplink duty cycle value for one or more serving cells with a relatively small overhead (e.g., one byte per serving cell).

As indicated above, FIGS. 4A-4H are provided as one or more examples. Other examples may differ from what is described with respect to FIGS. 4A-4H.

Figure 5:
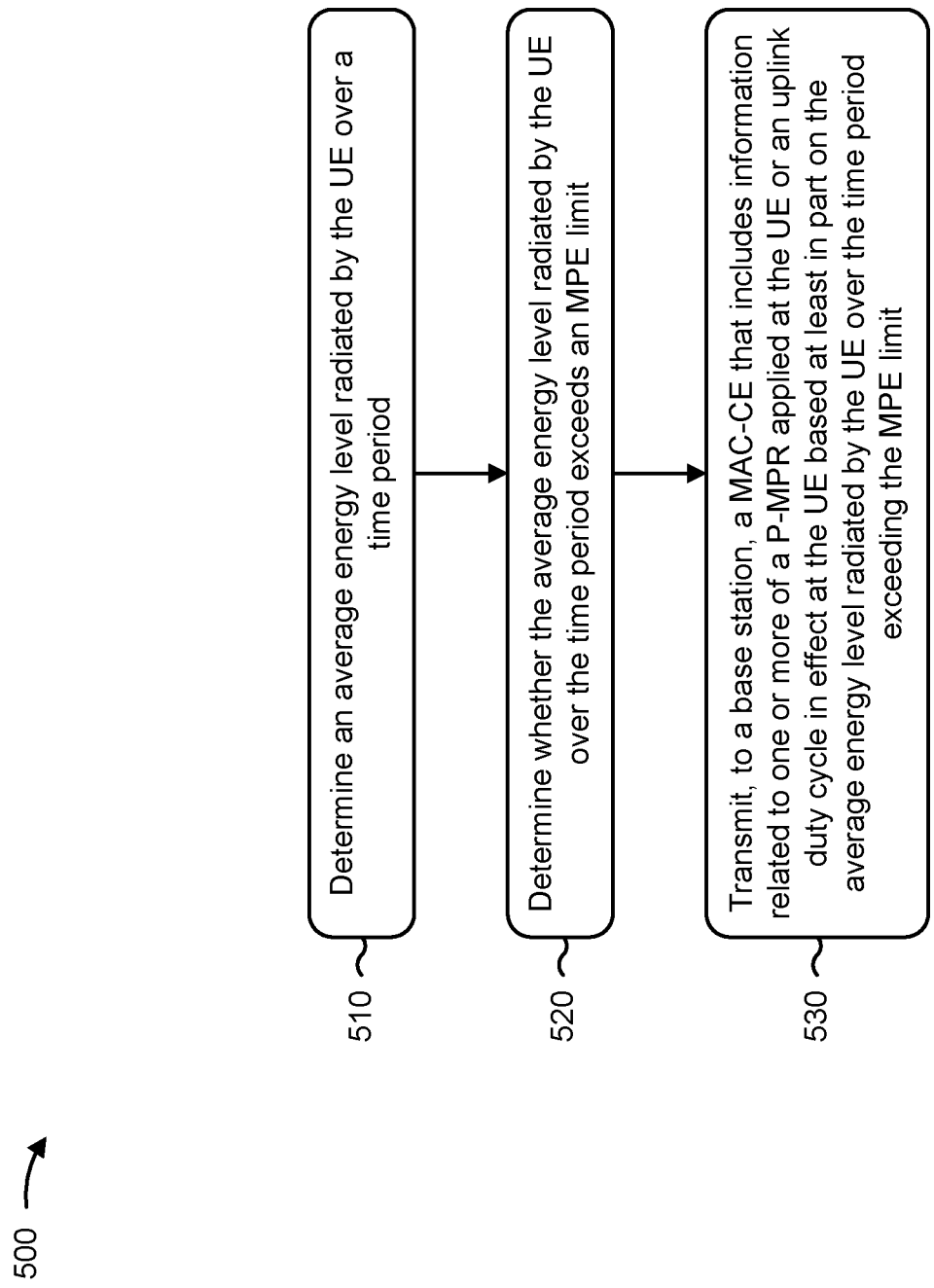
FIG. 5 is a diagram illustrating an example process performed, for example, by a UE, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120 and/or the like) performs operations associated with signaling an MPE backoff indication.

As shown in FIG. 5, in some aspects, process 500 may include determining an average energy level radiated by the UE over a time period (block 510). For example, the UE may determine (e.g., using controller/processor 280, memory 282, and/or the like) an average energy level radiated by the UE over a time period, as described above.

As further shown in FIG. 5, in some aspects, process 500 may include determining whether the average energy level radiated by the UE over the time period exceeds an MPE limit (block 520). For example, the UE may determine (e.g., using controller/processor 280, memory 282, and/or the like) whether the average energy level radiated by the UE over the time period exceeds an MPE limit, as described above.

As further shown in FIG. 5, in some aspects, process 500 may include transmitting, to a base station, a MAC-CE that includes information related to one or more of a P-MPR applied at the UE or an uplink duty cycle in effect at the UE, based at least in part on the average energy level radiated by the UE over the time period exceeding the MPE limit (block 530). For example, the UE may transmit (e.g., using controller/processor 280, transmit processor 264, TX MIMO processor 266, MOD 254, antenna 252, memory 282, and/or the like), to a base station, a MAC-CE that includes information related to one or more of a P-MPR applied at the UE or an uplink duty cycle in effect at the UE, based at least in part on the average energy level radiated by the UE over the time period exceeding the MPE limit, as described above.

Process 500 may include additional aspects, such as any single aspect or any combination of aspects described below and/or in connection with one or more other processes described elsewhere herein.

In a first aspect, the MAC-CE includes at least one power headroom entry that has an individual bit to indicate whether the P-MPR applied at the UE has a zero value or a non-zero value for a corresponding cell.

In a second aspect, alone or in combination with the first aspect, the individual bit corresponds to a first bit in a first octet of the MAC-CE.

In a third aspect, alone or in combination with one or more of the first and second aspects, the MAC-CE includes at least one power headroom entry that includes two bits to indicate a value or a state representing multiple possible values associated with the P-MPR applied at the UE for a corresponding cell.

In a fourth aspect, alone or in combination with one or more of the first through third aspects, the two bits are set to a predefined value to indicate that the P-MPR applied at the UE has a zero value.

In a fifth aspect, alone or in combination with one or more of the first through fourth aspects, the at least one power headroom entry further includes a field to indicate the uplink duty cycle in effect at the UE.

In a sixth aspect, alone or in combination with one or more of the first through fifth aspects, the MAC-CE includes at least one power headroom entry that includes a first bit to indicate whether the MAC-CE includes a field to indicate a value of the P-MPR applied at the UE for a corresponding cell, and a second bit to indicate whether the MAC-CE includes a field to indicate the uplink duty cycle in effect at the UE for the corresponding cell.

In a seventh aspect, alone or in combination with one or more of the first through sixth aspects, the MAC-CE includes one or more cell identifiers and one or more P-MPR entries that each include a first field to indicate a value of the P-MPR applied at the UE for a corresponding cell and a second field to indicate the uplink duty cycle in effect at the UE for the corresponding cell.

In an eighth aspect, alone or in combination with one or more of the first through seventh aspects, the MAC-CE includes a bitmap to indicate the one or more cell identifiers corresponding to the one or more P-MPR entries.

In a ninth aspect, alone or in combination with one or more of the first through eighth aspects, the MAC-CE explicitly indicates the one or more cell identifiers corresponding to the one or more P-MPR entries.

In a tenth aspect, alone or in combination with one or more of the first through ninth aspects, the MAC-CE includes at least one beam failure recovery entry that includes a field to indicate either a value of the P-MPR applied at the UE or the uplink duty cycle in effect at the UE for a corresponding cell.

In an eleventh aspect, alone or in combination with one or more of the first through tenth aspects, the at least one beam failure recovery entry further includes a bit that has a first value to indicate that the field indicates the value of the P-MPR applied at the UE, or a second value to indicate that the field indicates the uplink duty cycle in effect at the UE for the corresponding cell.

In a twelfth aspect, alone or in combination with one or more of the first through eleventh aspects, the MAC-CE is transmitted to periodically report the information related to the P-MPR applied at the UE or the uplink duty cycle in effect at the UE according to a periodic P-MPR reporting interval that is configured by the base station.

In a thirteenth aspect, alone or in combination with one or more of the first through twelfth aspects, the MAC-CE is transmitted to the base station to periodically report the information related to the P-MPR applied at the UE or the uplink duty cycle in effect at the UE according to a P-MPR reporting interval that is based at least in part on the uplink duty cycle in effect at the UE.

In a fourteenth aspect, alone or in combination with one or more of the first through thirteenth aspects, the MAC-CE is transmitted based at least in part on one or more of a current value of the P-MPR applied at the UE satisfying a threshold, a difference between the current value and a previous value of the P-MPR applied at the UE satisfying a threshold, or information received from the base station triggering a report of the P-MPR applied at the UE.

In a fifteenth aspect, alone or in combination with one or more of the first through fourteenth aspects, the MAC-CE is transmitted based at least in part on expiration of a P-MPR prohibit timer configured by the base station.

In a sixteenth aspect, alone or in combination with one or more of the first through fifteenth aspects, process 500 includes transmitting, to the base station, a request for an uplink grant based at least in part on determining that the UE does not have an available uplink grant, where the request indicates that a P-MPR reporting event has occurred at the UE, and process 500 further includes receiving the uplink grant, where the MAC-CE is transmitted using the uplink grant.

In a seventeenth aspect, alone or in combination with one or more of the first through sixteenth aspects, the request for the uplink grant is transmitted using one or more of a PUCCH resource or a RACH procedure.

In an eighteenth aspect, alone or in combination with one or more of the first through seventeenth aspects, the MAC-CE is transmitted using one or more of a pre-scheduled uplink grant, a dynamic uplink grant, or an uplink grant associated with a RAR message received from the base station.

In a nineteenth aspect, alone or in combination with one or more of the first through eighteenth aspects, process 500 includes incrementing an MPE detection counter based at least in part on the average energy level radiated by the UE over the time period exceeding the MPE limit, where the MAC-CE is transmitted based at least in part on the MPE detection counter satisfying a threshold.

In a twentieth aspect, alone or in combination with one or more of the first through nineteenth aspects, process 500 includes triggering an MPE detection timer based at least in part on incrementing the MPE detection counter, stopping the MPE detection timer based at least in part on one or more of the average energy level radiated by the UE failing to exceed the MPE limit over a subsequent time period or the base station deactivating a cell in which the average energy level radiated by the UE exceeded the MPE limit, and resetting the MPE detection counter based at least in part on determining that a condition is satisfied.

In a twenty-first aspect, alone or in combination with one or more of the first through twentieth aspects, the condition includes one or more of the MPE detection timer expiring, the average energy level radiated by the UE failing to exceed the MPE limit over the subsequent time period, the base station deactivating the cell in which the average energy level radiated by the UE exceeded the MPE limit, or the base station reconfiguring the MPE detection timer or the MPE detection counter.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
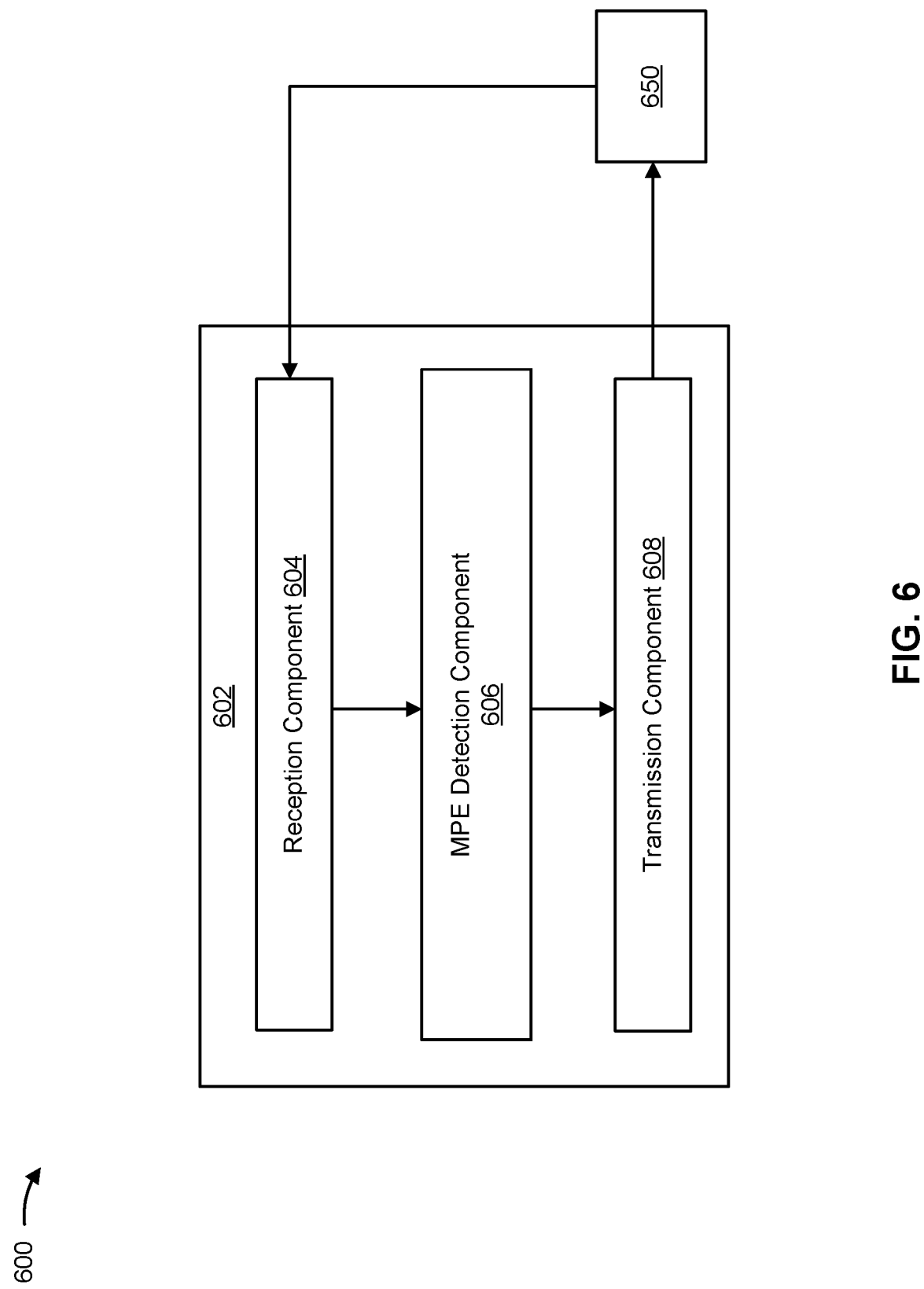
FIG. 6 is a conceptual data flow diagram illustrating a data flow between different components in an example apparatus, in accordance with various aspects of the present disclosure.

FIG. 6 is a conceptual data flow diagram 600 illustrating a data flow between different components in an example apparatus 602. The apparatus 602 may be a UE (e.g., UE 120). In some aspects, the apparatus 602 includes a reception component 604, an MPE detection component 606, a transmission component 608, and/or the like. As shown in FIG. 6, the apparatus 602 may communicate with another apparatus 650 (e.g., a base station) using the reception component 604 and/or the transmission component 608.

Reception component 604 may receive one or more downlink communications from apparatus 650. For example, reception component 604 may receive a RAR message, radio resource control (RRC) signal, downlink control information (DCI), and/or other suitable downlink communications from apparatus 650 that may configure an uplink grant for the apparatus 602. Additionally, or alternatively, reception component 603 may receive, from apparatus 650, information related to one or more scheduled uplink transmissions for the apparatus 602, a configuration for reporting a P-MPR and/or uplink duty cycle for one or more cells (e.g., information triggering a one-shot report of the P-MPR and/or uplink duty cycle for one or more cells, information configuring one or more prohibit timers for P-MPR and/or uplink duty cycle reporting, and/or the like). In some aspects, reception component 604 may include an antenna (e. g., antenna 252), a receive processor (e. g, receive processor 258), a controller/processor (e. g., controller/processor 280), a transceiver, a receiver, and/or the like.

MPE detection component 606 may detect one or more MPE issues that may occur when apparatus 602 is transmitting information (e.g., on an uplink). For example, MPE detection component 606 may determine an average energy level radiated by the apparatus 602 over a time period, may determine whether the average energy level radiated by the apparatus 602 over the time period exceeds an MPE limit, and/or the like. In some aspects, MPE detection component 606 may include a processor (e.g., a transmit processor 264, a receive processor 258, a controller/processor 280, and/or the like).

Transmission component 608 may transmit one or more uplink communications to apparatus 650. For example, transmission component 608 may transmit, to apparatus 650, a MAC-CE that includes information related to a P-MPR applied at the apparatus 602 for one or more cells, an uplink duty cycle in effect at the apparatus 602 for the one or more cells, and/or the like. In some aspects, transmission component 608 may include an antenna (e. g, antenna 252), a transmit processor (e. g, transmit processor 264), a controller/processor (e.g., controller/processor 280), a transceiver, a transmitter, and/or the like.

The apparatus may include additional components that perform each of the blocks of the algorithm in the aforementioned process 500 of FIG. 5 and/or the like. Each block in the aforementioned process 5 of FIG. 5 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining an average energy level radiated by the UE over a time period;
   determining whether the average energy level radiated by the UE over the time period exceeds a maximum permissible exposure (MPE) limit; and
   transmitting, to a base station, a medium access control (MAC) control element (MAC-CE) that includes:

a first field that indicates information related to one or more of a power management maximum power reduction (P-MPR) applied at the UE or an uplink duty cycle in effect at the UE based at least in part on the average energy level radiated by the UE over the time period exceeding the MPE limit, and a second field that indicates a maximum configured power for the UE.

2. The method of claim 1, wherein the MAC-CE includes at least one power headroom entry that has an individual bit to indicate whether the P-MPR applied at the UE has a zero value or a non-zero value for a corresponding cell.

3. The method of claim 1, wherein the MAC-CE includes at least one power headroom entry that includes two bits to indicate a value or a state representing multiple possible values associated with the P-MPR applied at the UE for a corresponding cell.

4. The method of claim 3, wherein the two bits are set to a predefined value to indicate that the P-MPR applied at the UE has a zero value.

5. The method of claim 3, wherein the at least one power headroom entry further includes a field to indicate the uplink duty cycle in effect at the UE.

6. The method of claim 1, wherein the MAC-CE includes at least one power headroom entry that includes a first bit to indicate whether the MAC-CE includes a field to indicate a value of the P-MPR applied at the UE for a corresponding cell and a second bit to indicate whether the MAC-CE includes a field to indicate the uplink duty cycle in effect at the UE for the corresponding cell.

7. The method of claim 1, wherein the MAC-CE includes one or more cell identifiers and one or more P-MPR entries that each include a first field to indicate a value of the P-MPR applied at the UE for a corresponding cell and a second field to indicate the uplink duty cycle in effect at the UE for the corresponding cell.

8. The method of claim 1, wherein the MAC-CE includes at least one beam failure recovery entry that includes a field to indicate either a value of the P-MPR applied at the UE or the uplink duty cycle in effect at the UE for a corresponding cell.

9. The method of claim 8, wherein the at least one beam failure recovery entry further includes a bit that has a first value to indicate that the field indicates the value of the P-MPR applied at the UE or a second value to indicate that the field indicates the uplink duty cycle in effect at the UE for the corresponding cell.

10. The method of claim 1, wherein the MAC-CE is transmitted to periodically report the information related to the P-MPR applied at the UE or the uplink duty cycle in effect at the UE according to a periodic P-MPR reporting interval that is configured by the base station.

11. The method of claim 1, wherein the MAC-CE is transmitted to the base station to periodically report the information related to the P-MPR applied at the UE or the uplink duty cycle in effect at the UE according to a P-MPR reporting interval that is based at least in part on the uplink duty cycle in effect at the UE.

12. The method of claim 1, wherein the MAC-CE is transmitted based at least in part on one or more of a current value of the P-MPR applied at the UE satisfying a threshold, a difference between the current value and a previous value of the P-MPR applied at the UE satisfying a threshold, or information received from the base station triggering a report of the P-MPR applied at the UE.

13. The method of claim 1, wherein the MAC-CE is transmitted based at least in part on expiration of a P-MPR prohibit timer configured by the base station.

14. The method of claim 1, further comprising:
transmitting, to the base station, a request for an uplink grant based at least in part on determining that the UE does not have an available uplink grant, wherein the request indicates that a P-MPR reporting event has occurred at the UE; and
receiving the uplink grant, wherein the MAC-CE is transmitted using the uplink grant.

15. The method of claim 1, further comprising:
incrementing an MPE detection counter based at least in part on the average energy level radiated by the UE over the time period exceeding the MPE limit, wherein the MAC-CE is transmitted based at least in part on the MPE detection counter satisfying a threshold.

16. The method of claim 15, further comprising:
triggering an MPE detection timer based at least in part on incrementing the MPE detection counter;
stopping the MPE detection timer based at least in part on one or more of the average energy level radiated by the UE failing to exceed the MPE limit over a subsequent time period or the base station deactivating a cell in which the average energy level radiated by the UE exceeded the MPE limit; and
resetting the MPE detection counter based at least in part on determining that a condition is satisfied.

17. A user equipment (UE) for wireless communication, comprising:
one or more memories; and
one or more processors coupled to the one or more memories, the one or more processors configured to:
determine an average energy level radiated by the UE over a time period;
determine whether the average energy level radiated by the UE over the time period exceeds a maximum permissible exposure (MPE) limit; and
transmit, to a base station, a medium access control (MAC) control element (MAC-CE) that includes:
a first field that indicates information related to one or more of a power management maximum power reduction (P-MPR) applied at the UE or an uplink duty cycle in effect at the UE based at least in part on the average energy level radiated by the UE over the time period exceeding the MPE limit, and
a second field that indicates a maximum configured power for the UE.

18. The UE of claim 17, wherein the MAC-CE includes at least one power headroom entry that has an individual bit to indicate whether the P-MPR applied at the UE has a zero value or a non-zero value for a corresponding cell.

19. The UE of claim 17, wherein the MAC-CE includes at least one power headroom entry that includes two bits to indicate a value or a state representing multiple possible values associated with the P-MPR applied at the UE for a corresponding cell.

20. The UE of claim 19, wherein the two bits are set to a predefined value to indicate that the P-MPR applied at the UE has a zero value.

21. The UE of claim 19, wherein the at least one power headroom entry further includes a field to indicate the uplink duty cycle in effect at the UE.

22. The UE of claim 17, wherein the MAC-CE includes at least one power headroom entry that includes a first bit to indicate whether the MAC-CE includes a field to indicate a value of the P-MPR applied at the UE for a corresponding cell and a second bit to indicate whether the MAC-CE includes a field to indicate the uplink duty cycle in effect at the UE for the corresponding cell.

23. The UE of claim 17, wherein the MAC-CE includes one or more cell identifiers and one or more P-MPR entries that each include a first field to indicate a value of the P-MPR applied at the UE for a corresponding cell and a second field to indicate the uplink duty cycle in effect at the UE for the corresponding cell.

24. The UE of claim 17, wherein the MAC-CE includes at least one beam failure recovery entry that includes a field to indicate either a value of the P-MPR applied at the UE or the uplink duty cycle in effect at the UE for a corresponding cell.

25. The UE of claim 24, wherein the at least one beam failure recovery entry further includes a bit that has a first value to indicate that the field indicates the value of the P-MPR applied at the UE or a second value to indicate that the field indicates the uplink duty cycle in effect at the UE for the corresponding cell.

26. The UE of claim 17, wherein the MAC-CE is transmitted to periodically report the information related to the P-MPR applied at the UE or the uplink duty cycle in effect at the UE according to a periodic P-MPR reporting interval that is configured by the base station.

27. The UE of claim 17, wherein the MAC-CE is transmitted to the base station to periodically report the information related to the P-MPR applied at the UE or the uplink duty cycle in effect at the UE according to a P-MPR reporting interval that is based at least in part on the uplink duty cycle in effect at the UE.

28. The UE of claim 17, wherein the MAC-CE is transmitted based at least in part on one or more of a current value of the P-MPR applied at the UE satisfying a threshold, a difference between the current value and a previous value of the P-MPR applied at the UE satisfying a threshold, or information received from the base station triggering a report of the P-MPR applied at the UE.

29. The UE of claim 17, wherein the MAC-CE is transmitted based at least in part on expiration of a P-MPR prohibit timer configured by the base station.

30. The UE of claim 17, wherein the one or more processors are further configured to:
   transmit, to the base station, a request for an uplink grant based at least in part on determining that the UE does not have an available uplink grant, wherein the request indicates that a P-MPR reporting event has occurred at the UE; and
   receive the uplink grant, wherein the MAC-CE is transmitted using the uplink grant.

31. The UE of claim 17, wherein the one or more processors are further configured to:
   increment an MPE detection counter based at least in part on the average energy level radiated by the UE over the time period exceeding the MPE limit, wherein the MAC-CE is transmitted based at least in part on the MPE detection counter satisfying a threshold.

32. The UE of claim 31, wherein the one or more processors are further configured to:

trigger an MPE detection timer based at least in part on incrementing the MPE detection counter;
stop the MPE detection timer based at least in part on one or more of the average energy level radiated by the UE failing to exceed the MPE limit over a subsequent time period or the base station deactivating a cell in which the average energy level radiated by the UE exceeded the MPE limit; and
reset the MPE detection counter based at least in part on determining that a condition is satisfied.

33. The UE of claim 32, wherein the condition includes one or more of the MPE detection timer expiring, the average energy level radiated by the UE failing to exceed the MPE limit over the subsequent time period, the base station deactivating the cell in which the average energy level radiated by the UE exceeded the MPE limit, or the base station reconfiguring the MPE detection timer or the MPE detection counter.

34. A non-transitory computer-readable medium storing one or more instructions for wireless communication, the one or more instructions comprising:
   one or more instructions that, when executed by one or more processors of a user equipment (UE), cause the one or more processors to:
      determine an average energy level radiated by the UE over a time period;
      determine whether the average energy level radiated by the UE over the time period exceeds a maximum permissible exposure (MPE) limit; and
      transmit, to a base station, a medium access control (MAC) control element (MAC-CE) that includes:
         a first field that indicates information related to one or more of a power management maximum power reduction (P-MPR) applied at the UE or an uplink duty cycle in effect at the UE based at least in part on the average energy level radiated by the UE over the time period exceeding the MPE limit, and
         a second field that indicates a maximum configured power for the UE.

35. An apparatus for wireless communication, comprising:
   means for determining an average energy level radiated by the apparatus over a time period;
   means for determining whether the average energy level radiated by the apparatus over the time period exceeds a maximum permissible exposure (MPE) limit; and
   means for transmitting, to a base station, a medium access control (MAC) control element (MAC-CE) that includes:
      a first field that indicates information related to one or more of a power management maximum power reduction (P-MPR) applied at the apparatus or an uplink duty cycle in effect at the apparatus based at least in part on the average energy level radiated by the apparatus over the time period exceeding the MPE limit, and
      a second field that indicates a maximum configured power for the apparatus.

* * * * *